United States Patent
Stephan et al.

(10) Patent No.: US 11,299,042 B2
(45) Date of Patent: Apr. 12, 2022

(54) ASSEMBLY FOR MOUNTING A WHEEL TO A PORTAL GEAR BOX OF AN OFF-ROAD VEHICLE

(71) Applicant: Super ATV, LLC, Madison, IN (US)

(72) Inventors: Jordan E. Stephan, Hanover, IN (US); Justin L. Eaton, Hanover, IN (US)

(73) Assignee: Super ATV, LLC, Madison, IN (US)

( * ) Notice: Subject to any disclaimer, the term of this patent is extended or adjusted under 35 U.S.C. 154(b) by 0 days.

(21) Appl. No.: 17/406,522

(22) Filed: Aug. 19, 2021

(65) Prior Publication Data

US 2021/0379986 A1     Dec. 9, 2021

Related U.S. Application Data

(63) Continuation of application No. 16/747,057, filed on Jan. 20, 2020.

(60) Provisional application No. 62/794,764, filed on Jan. 21, 2019.

(51) Int. Cl.
| | |
|---|---|
| *B60K 17/04* | (2006.01) |
| *B60K 17/22* | (2006.01) |
| *F16H 57/028* | (2012.01) |
| *F16H 57/02* | (2012.01) |
| *F16H 1/20* | (2006.01) |

(52) U.S. Cl.
CPC ............ *B60K 17/043* (2013.01); *B60K 17/22* (2013.01); *F16H 57/028* (2013.01); *F16H 1/20* (2013.01); *F16H 2057/02039* (2013.01)

(58) Field of Classification Search
CPC ..... B60K 17/043; B60K 17/22; F16H 57/028; B60B 35/001
See application file for complete search history.

(56) References Cited

U.S. PATENT DOCUMENTS

| | | | | |
|---|---|---|---|---|
| 1,316,918 A | * | 9/1919 | Dunham | B60K 17/306 180/255 |
| 1,396,102 A | * | 11/1921 | Dunham | B60K 17/306 180/255 |
| 1,427,584 A | * | 8/1922 | Denison | B60K 17/043 74/390 |
| 4,004,838 A | | 1/1977 | Savage | |

(Continued)

FOREIGN PATENT DOCUMENTS

EP      0272567      6/1988

OTHER PUBLICATIONS

English Translation of EP 0272567.

*Primary Examiner* — Jake Cook
(74) *Attorney, Agent, or Firm* — Woodard, Emhardt, Henry, Reeves & Wagner, LLP

(57) ABSTRACT

A vibration-reducing portal box assembly for mounting a wheel of an off-road vehicle includes a housing with a receptacle adapted to receive a stock axle shaft of an off-road vehicle, an output shaft operably connectable to a stock axle received in the housing and effective to rotate upon rotation of said stock axle, and a wheel hub having a central opening adapted to receive said output shaft, and adapted to turn a wheel mounted to said wheel hub upon rotation of said output shaft. The output shaft has a tapered portion connecting its proximal end to its distal end. The wheel hub has a tapered portion adapted to matingly receive the tapered portion of the output shaft. The output shaft may be connected to the stock axle shaft by a geared linking mechanism.

10 Claims, 6 Drawing Sheets

(56) References Cited

U.S. PATENT DOCUMENTS

| | | | | |
|---|---|---|---|---|
| 4,618,159 A | * | 10/1986 | Kozyra | ............ B62D 7/18 280/93.512 |
| 5,472,059 A | | 12/1995 | Schlosser et al. | |
| 6,599,052 B1 | | 7/2003 | Phillips | |
| 8,985,264 B2 | * | 3/2015 | Shirley | ......... B60K 17/043 180/371 |
| 10,479,156 B2 | * | 11/2019 | Eaton | ............ B60K 17/043 |

* cited by examiner

ASSEMBLY FOR MOUNTING A WHEEL TO A PORTAL GEAR BOX OF AN OFF-ROAD VEHICLE

REFERENCE TO RELATED APPLICATIONS

This application claims priority from U.S. patent application Ser. No. 16/747,057, filed Jan. 20, 2020, which claims the benefit of U.S. Provisional Application No. 62/794,764, filed Jan. 21, 2019; the entire contents of both prior applications being hereby incorporated herein by reference.

FIELD OF THE INVENTION

The present invention relates generally to portal wheel ends for lifting the wheels of an off road vehicle such as an all-terrain vehicle (ATV) or a utility task vehicle (UTV), and more particularly to an assembly for mounting a wheel to portal box in a manner effective to reduce wheel vibration.

BACKGROUND OF THE INVENTION

Portal boxes are known to ATV and UTV enthusiasts for providing increased ground clearance, or lift, and the low gearing needed for bigger tires. Such boxes are typically mounted to an ATV/UTV by first mounting a backing plate to the suspension of the vehicle, and by then mounting the portal box to the backing plate. U.S. Pat. No. 8,985,264 to Shirley is one example of such a device.

Among the improvements made by applicant to portal gear box assemblies are improvements designed to lengthen the wheelbase of the vehicle and to provide the ability to select among several wheelbase lengths. Improvements to the braking power provided by portal gear boxes are also being developed. But the connection between the portal output shaft and the associated wheel hub has never been optimized to improve reduce vibration in the wheel.

A need therefore exists for a portal box shaft and hub assembly that reduces wheel vibration and associated wear. The present invention addresses that need.

SUMMARY OF THE INVENTION

Briefly describing one aspect of the present invention, there is provided a portal box assembly for mounting a wheel of an off-road vehicle. The assembly preferably includes a housing with a receptacle adapted to receive a stock axle shaft of an off-road vehicle, an output shaft operably connectable to a stock axle received in the housing and effective to rotate upon rotation of the stock axle, and a wheel hub having a central opening adapted to receive the output shaft and effective to turn a wheel mounted to the wheel hub upon rotation of the output shaft. The output shaft has a tapered portion connecting its proximal end to its distal end, and the wheel hub has a tapered portion of its central opening. The tapered portion of the central opening of the wheel hub matingly receives the tapered portion of the output shaft in a manner effective to join the hub and shaft together for concentricity and less run out, thus reducing wheel vibration, particularly at higher speeds.

The output shaft may be connected to the stock axle shaft by a geared linking mechanism which preferably comprises an input gear operably linked to said stock axle to rotate upon rotation of said stock axle, and an output gear operably linked to said input gear to rotate in the same direction as said stock axle. The linking mechanism directly or indirectly connects the stock axle to the output shaft in a manner effective to cause the output shaft to rotate at a slower speed than the stock axle.

DESCRIPTION OF THE PREFERRED EMBODIMENTS

For the purposes of promoting an understanding of the principles of the invention, reference will now be made to certain embodiments and specific language will be used to describe the same. It will nevertheless be understood that no limitation of the scope of the invention is thereby intended, such alterations and further modifications in the described device, and such further applications of the principles of the invention as illustrated therein, being contemplated as would normally occur to one skilled in the art to which the invention relates.

As indicated above, one aspect of the present invention relates to a vibration-reducing portal box assembly for mounting a wheel of an off-road vehicle. The assembly preferably includes a housing with a receptacle adapted to receive a stock axle shaft of an off-road vehicle, an output shaft operably connectable to a stock axle received in the housing and effective to rotate upon rotation of said stock axle, and a wheel hub having a central opening adapted to receive said output shaft, and adapted to turn a wheel mounted to said wheel hub upon rotation of said output shaft. The output shaft has a tapered portion connecting its proximal end portion to its distal end portion, and the wheel hub has a tapered portion adapted to matingly receive the tapered portion of the output shaft. The tapered shaft and hub arrangement locks the hub and shaft together for concentricity and less run out.

As is known to the art, portal gear box assemblies are useful for lifting the chassis and increasing the wheel torque of light off road four-wheel drive vehicles such as a UTV or an ATV, such as the ATVs and UTVs manufactured by Polaris, Can-Am, Honda, Yamaha, Arctic Cat, and the like. However, it will be appreciated by those skilled in the art that the invention is applicable to other vehicles, and to ATV and/or UTVS made by other manufacturers.

In one preferred embodiment the inventive vibration-reducing portal box assembly replaces a vehicle's original wheel hub assembly.

Figure 1:
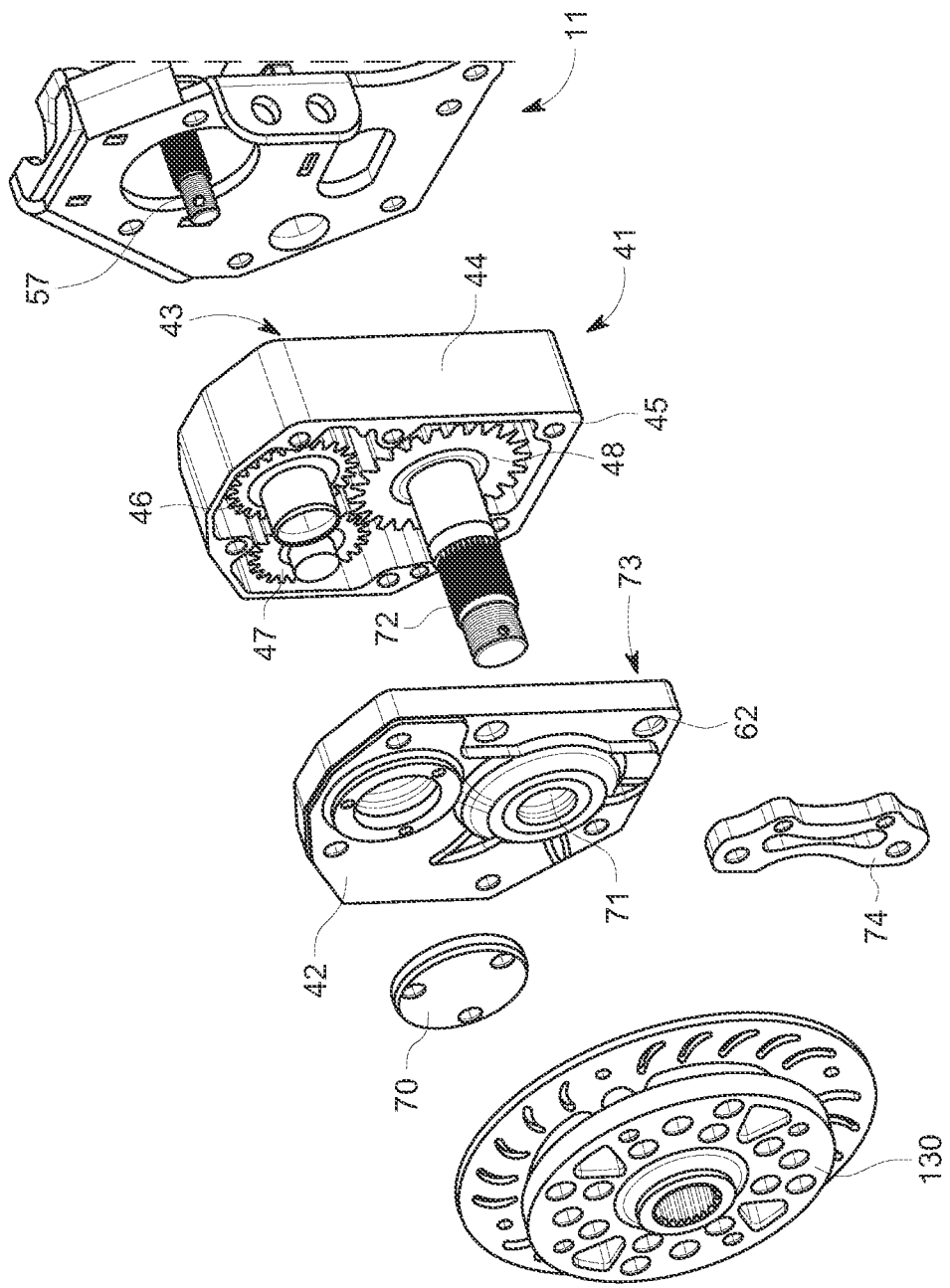
FIG. 1 is an exploded isometric view of a portal box assembly adapted to employ the vibration-reducing feature of the present invention.

As shown in the embodiment illustrated in FIG. 1, portal box assemblies may include: a) a backing plate to mount the assembly to a vehicle; b) a portal gear box having an opening receive the stock axle, an output shaft to attach to a wheel, and a set of gears to connect the stock axle to the output shaft in a manner effective to transfer power from the stock axle to the output shaft and to reduce the gearing; and c) a wheel hub to connect the output shaft to a wheel.

In the illustrated embodiment the portal box housing preferably comprises a case 41 and a cover 42. Both the case 41 and cover 42 may be machined metal bodies, preferably of high strength steel or aluminum. Alternatively, the case can be cast or forged to a rough configuration, and then finish machined. The case 41 preferably has a rear or inboard main wall 43 and an integral peripheral wall 44. A face 45 of the peripheral wall 44 lies in a plane parallel to the plane of the main wall 43. The peripheral wall 44 forms a space for receiving meshed spur gears 46-48. An aperture in the case wall 43 receives the stock axle shaft 57 of an associated axle.

The cover 42 may be a flat plate proportioned to mate with the face 45 of the peripheral case wall 44. The cover may have holes 62 that fit closely over bosses in the case 41 and thereby register the cover with the case. An inside face of the cover 42 may be machined with recesses to receive and support bearings. At an upper region, cover 42 may have a clearance hole for receiving the distal end of the stock axle shaft 57. Screws (not shown) may hold a cap 70 over the hole 68. A clearance hole 71 in the cover 42 allows passage of an output shaft 72. At its outer face, the cover 42 may be provided with an elongated recess 73 for receiving a brake caliper bracket 74. Brake caliper bracket 74 may have holes that align with holes in the cover 42 and one or more of the holes in backing plate 11.

The upper gear 46 is the input gear to the gear train or set illustrated in the drawings. Gear 46 may have an internal spline cut to match the exterior spline on the stock axle output shaft 57 of the vehicle. Gear 46 may have integral hollow stub shafts supported in bearings 53 on one or more sides.

The lower gear 48 is the output gear that drives the output shaft of the assembly. The output gear 48 is internally splined and fits on an external spline of the output shaft 72. The output shaft is preferably rotationally supported in bearings, supported in the case wall 43 and cover 42. It will be seen that the centers of the input gear 46 and output shaft 72 are vertically aligned so that a wheel 12 mounted on the output shaft is dropped vertically from the original vehicle axle represented by the stock axle shaft 57. Moreover, the pitch diameter of the output gear 48 is substantially larger than the input gear 46 so as to multiply the torque available at the output shaft 72.

A linking ("idler") gear 47 connects the input gear to the output gear. The linking gear maybe selected to reduce the gear ratio and thus to facilitate running larger tires on the vehicle without sacrificing torque.

The cover 42, case 41, and backing plate 11 are held together by bolts 81 assembled through respective holes in these components. Commercially available seals (not shown) may be provided at a case wall aperture and/or cover hole to exclude dirt, dust, and to contain lubricant within the case. A gasket may be provided between the cover 42 and case face 45; similarly, a gasket may be provided between the cap 70 and cover 42.

Output shaft 72 includes an inner (proximal) end portion, a tapered portion, and an outer (distal) end portion. The outer end portion may include a splined portion that cooperates with and turns a corresponding wheel hub upon rotation of the output shaft.

Wheel hub 82 may be retained on an external spline of the output shaft 72 by a nut 83 threaded on the distal end of the output shaft. Wheel hub 82 connects to and drives a wheel to propel the vehicle in a forward or rearward or turning direction. As is known to the art, brakes may be used to slow or stop the rotation of wheel hub 82.

The vibration-reducing portal box assembly 10 may be mounted to a vehicle with a backing plate 11. A separate backing plate 11 is attached to the vehicle at each wheel, with the backing plates being adapted for use on that wheel. Each backing plate 11 may be provided with upper and lower mounting brackets. Preferably, the backing plate 11 is a steel plate, and any mounting brackets are similarly made of steel.

Figure 2:
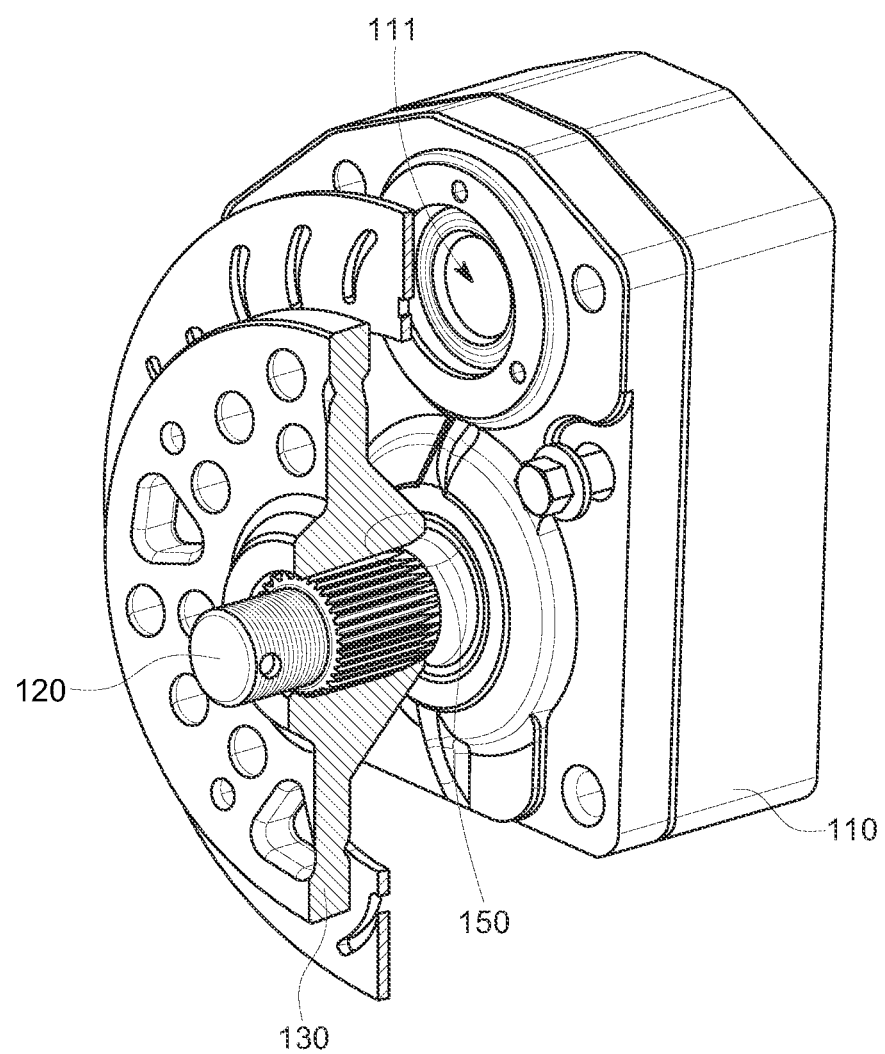
FIG. 2 is a perspective view in partial section of a portal box assembly employing the vibration-reducing feature of the present invention.
Figure 3:
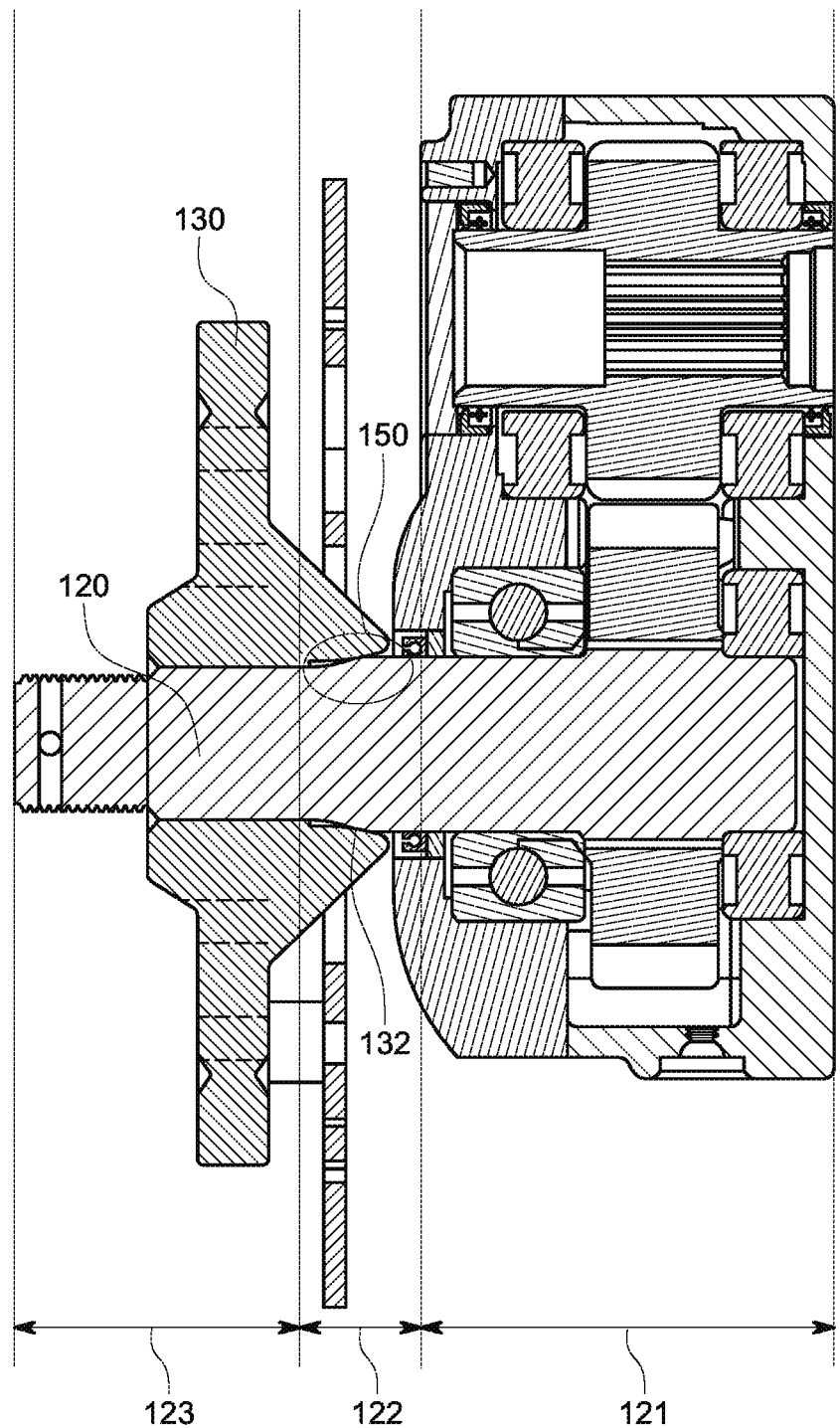
FIG. 3 is a side elevational view in full section showing a portal box assembly employing the vibration-reducing feature of the present invention.

As shown more clearly in FIGS. 2 and 3, the inventive portal gear box and wheel hub assembly includes a tapered interface between the portal output shaft and the opening of the wheel hub. This improves the concentricity of the shaft/hub connection, reducing runout and associated wheel vibration.

In the context of the present invention, runout is defined as the degree to which an axle or wheel hub, or a coupling between the output shaft and the wheel hub, deviates from true circular rotation. Every shaft or coupling has a center of rotation, and any stray from concentricity is considered runout. If runout is severe, it may cause problems with equipment, such as excessive vibration, wear, and bearing damage. One object of the present invention is to reduce excessive vibration, and associated wear and bearing damage.

Accordingly, FIG. 2 shows a perspective view in partial section of a portal box assembly employing the vibration-reducing feature of the present invention. Vibration-reducing portal box assembly 100 includes housing 110 and output shaft 120, and wheel hub 130. Output shaft 120 includes an inner (proximal) end portion, a tapered portion, and an outer (distal) end portion. The outer end portion may include a splined portion that cooperates with and turns a corresponding wheel hub upon rotation of the output shaft.

Wheel hub 130 includes a central opening to receive output shaft 120. At least a portion of the central opening is tapered to mate with the corresponding tapered portion of the output shaft.

FIG. 3 is a side elevational view in full section showing a portal box assembly employing the vibration-reducing feature of the present invention. Output shaft 120 and wheel hub 130 interface at tapered portion 122 of the output shaft between proximal end portion 121 and distal end portion 123. Tapered portion 122 includes a tapered face 150, where the tapered portion 122 of the output shaft meets the tapered portion 132 of the wheel hub to join the hub and shaft together in a manner the improves concentricity and reduces run out. In particular, output shaft 120 fits in wheel hub 130 such that the tapered portion 122 of the output shaft 120 receives and joins with the tapered portion 132 of wheel hub 130 along some or all of tapered face 150. Most preferably, the angle presented by some or all of the tapered face of the shaft substantially matches and mates with the angle presented by the tapered face of the wheel hub in a manner effective to cause the two bodies to lock more securely together. When so joined, rotation of the stock axle causes the portal box output axle to rotate, which rotates the wheel hub and thus the wheel. When the portal box includes gears to reduce the rotation, the wheels turn at a slower speed than the stock axle turns, thus facilitating running larger diameter tires on the vehicle without sacrificing torque.

As illustrated by the Figures, and as is known to the art, the output shaft is a generally cylindrical shaft that defines a longitudinal axis around which the shaft rotates. The diameter of the cylinder may vary along its length, with the proximal end portion 121 frequently having a larger diameter than the distal end portion 123. The tapered portion 122 between proximal end portion 121 and distal end portion 123 reduces the diameter of the shaft and forms an angle α with respect to the straight portions of the shaft.

In the preferred embodiments of the present invention the tapered portion of the output shaft is angled at an angle of between about 8° and about 12° with respect to the adjacent cylindrical portion of the shaft. In the most preferred embodiment the tapered portion of said output shaft is angled at an angle of about 10°.

Similarly, the tapered portion of the receiving opening of the wheel hub is also angled at an angle of between about 8° and about 12° with respect to the longitudinal axis of that opening (which matched the longitudinal axis of the output shaft). In the most preferred embodiment the tapered portion of the tapered portion of the receiving opening of the wheel hub is angled at an angle of about 10°.

As indicated above and as shown in the drawings, the tapered portion of the output shaft meets and is received into the tapered portion of the central opening of the wheel hub. This causes the output shaft to join with the wheel hub in a manner in which the shaft is centered in the hub. This improved concentricity reduces run out, and thereby reduces vibration in the wheel as it turns with the output axle.

Figure 4:
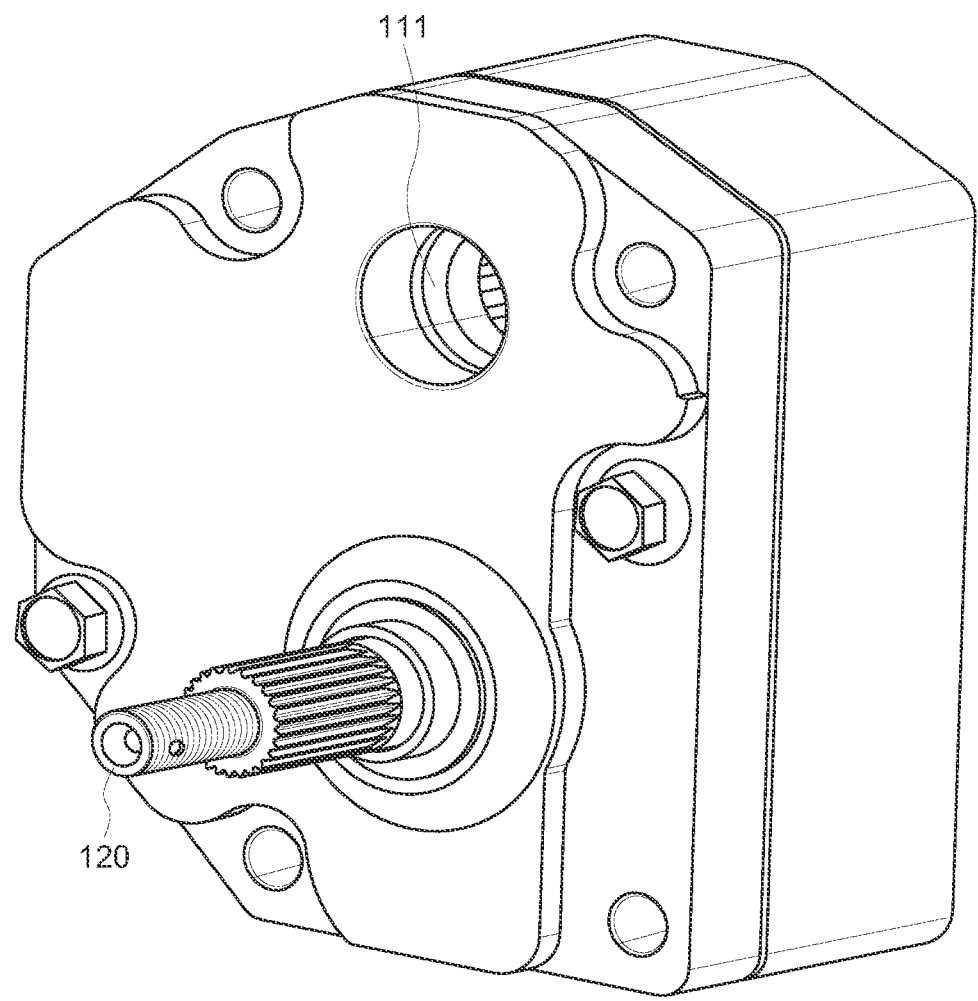
FIG. 4 is a perspective view of a portal box assembly adapted to employ the vibration-reducing feature of the present invention.

FIG. 4 is a perspective view of a portal box assembly adapted to employ the vibration-reducing feature of the present invention. Housing 110 includes a receptacle 111 adapted to receive a stock axle shaft 105 of an off-road vehicle. An output shaft 120 is operably connectable to a stock axle 105 received in housing 110. Output shaft 120 is effective to rotate upon rotation of stock axle 105.

Figure 5:
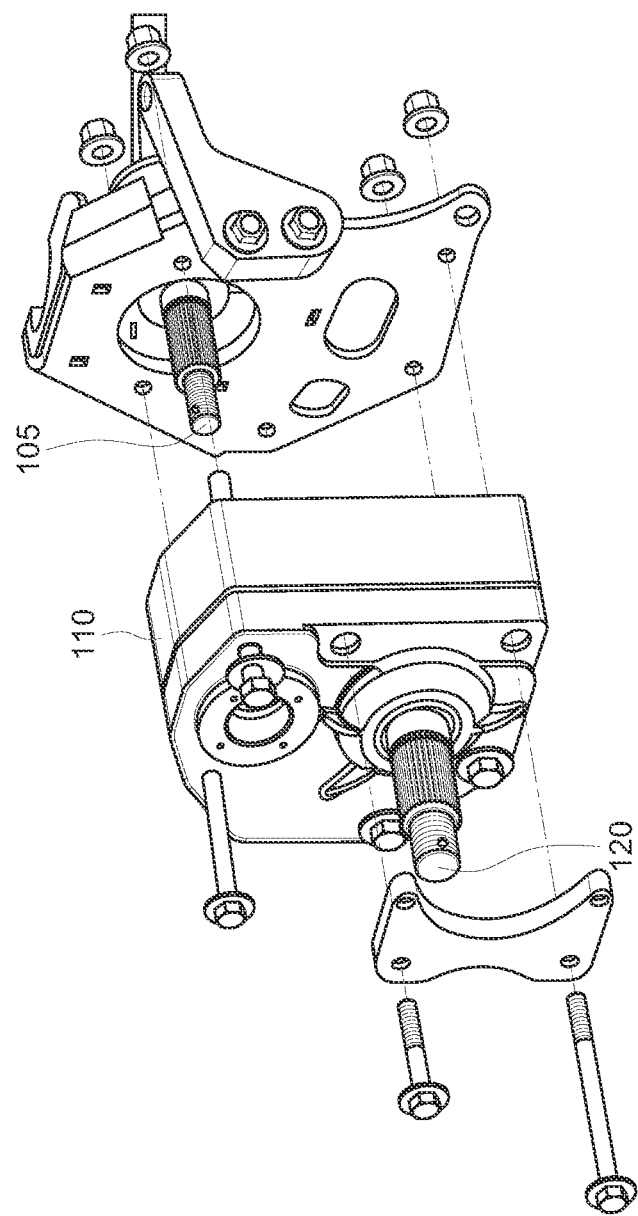
FIG. 5 is a partially exploded isometric view of portions of a portal box assembly adapted to employ the vibration-reducing feature of the present invention, showing the stock axle, the housing box, and the output shaft.

FIG. 5 is a partially exploded isometric view of portions of a portal box assembly adapted to employ the vibration-reducing feature of the present invention, showing the stock axle 105, the housing box 110, and the output shaft 120. Backing plate 111 is mountable to an off-road vehicle, and assembly housing 110 is mountable to backing plate 111. Output shaft 120 extends from the assembly, and is operably connectable to a stock axle 105 received in housing 110. Output shaft 120 includes a tapered portion 122 that cooperates with a mating tapered portion 132 of a wheel hub to rotate a vehicle wheel upon rotation of stock axle 105.

Figure 6:
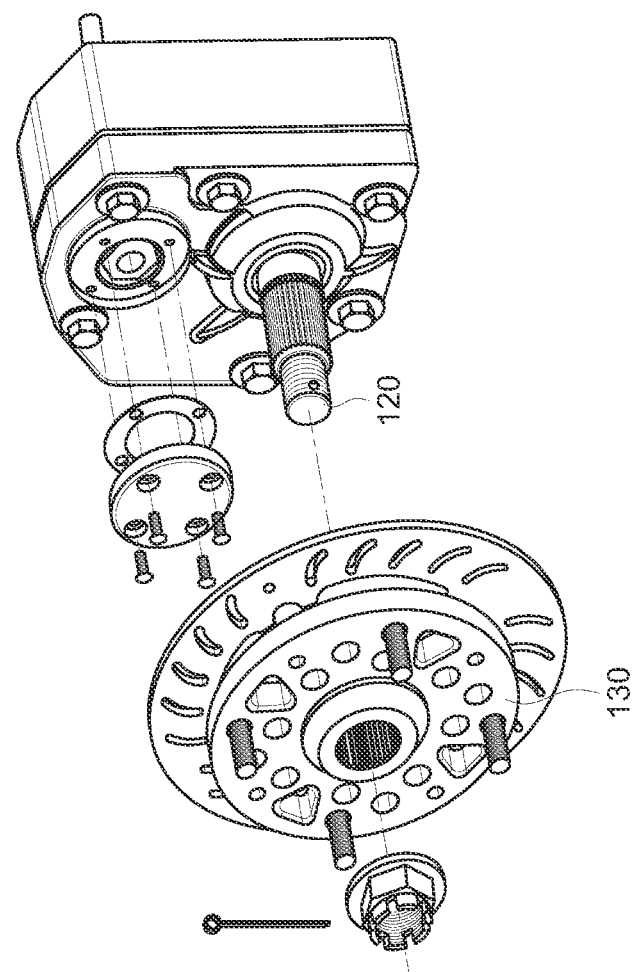
FIG. 6 is a partially exploded isometric view of portions of a portal box assembly adapted to employ the vibration-reducing feature of the present invention, showing the housing, the output shaft, and the wheel hub.

FIG. 6 is a partially exploded isometric view of portions of a portal box assembly adapted to employ the vibration-reducing feature of the present invention, showing the housing, the output shaft, and the wheel hub. Output shaft 120 extends from the assembly, and is operably connectable to a stock axle 105 received in housing 110. Output shaft 120 includes a tapered portion 122 that cooperates with a mating tapered portion 132 of a wheel hub to rotate a vehicle wheel upon rotation of stock axle 105.

While the invention has been illustrated and described in detail in the drawings and foregoing description, the same are to be considered as illustrative and not restrictive, it being understood that only certain preferred embodiments have been shown and described and that all changes and modifications that come within the spirit of the invention are desired to be protected. In addition, it is to be appreciated that the present invention may comprise or consist essentially of any or all of the described or illustrated features. For example, the present invention includes devices and methods comprising any or all of the features described or illustrated in specification or drawings, and the present invention includes devices and methods consisting essentially of any or all of the features illustrated in the specification or drawings. Additionally, any or all of the features and/or embodiments disclosed herein may be combined with any or all of the other features and/or embodiments disclosed herein to provide a device or method that comprises or consists essentially of such features.

Finally, the grammatical device "and/or" (such as in "A and/or B") is used in this disclosure to mean A alone, or B alone, or both A and B.

The invention claimed is:

1. A vibration-reducing portal box assembly for mounting a wheel of an off-road vehicle, comprising:
   a) a box housing having a receptacle adapted to receive a stock axle shaft of an off-road vehicle;
   b) an output shaft operably connectable to a stock axle received in said housing and effective to rotate upon rotation of said stock axle;
   wherein said output shaft has a proximal end portion having a first diameter, a distal end portion having a second, reduced, diameter, and a tapered portion connecting the proximal end portion to the distal end portion;
   wherein said tapered portion of said output shaft is angled at an angle of between about 8° and about 12° with respect to the adjacent proximal and distal end portions of the shaft;
   c) a wheel hub having a central opening adapted to receive said output shaft, and adapted to turn a wheel mounted to said wheel hub upon rotation of said output shaft;
   wherein the central opening of said wheel hub has a proximal end portion having a first diameter, and distal end portion having a second, reduced, diameter, and a tapered portion therebetween to matingly receive the tapered portion of the output shaft in a manner effective to join the hub and shaft together with improved concentricity and less run out; and
   wherein in the area where the diameter of the output shaft and the diameter of the wheel hub are reduced, the wheel hub supports the output shaft.

2. A vibration-reducing portal box assembly according to claim 1 wherein said output shaft is operably connectable to the stock axle shaft by a linking mechanism.

3. A vibration-reducing portal box assembly according to claim 2 wherein said linking mechanism comprises one or more gears.

4. A vibration-reducing portal box assembly according to claim 3 wherein said one or more gears comprises an input gear operably linked to said stock axle to rotate upon rotation of said stock axle, and an output gear operably linked to said input gear to rotate in the same direction as said stock axle.

5. A vibration-reducing portal box assembly according to claim 4 wherein said linking mechanism additionally comprises a linking gear.

6. A vibration-reducing portal box assembly according to claim 5 wherein said linking mechanism directly or indirectly connects the stock axle to the output shaft in a manner effective to cause the output shaft to rotate at a slower speed than the stock axle.

7. A vibration-reducing portal box assembly according to claim 1 wherein said tapered portion of said output shaft is angled at an angle of about 10° with respect to the adjacent proximal and distal end portions of the shaft.

8. A vibration-reducing portal box assembly according to claim 1 wherein at least a portion of the distal end of said output shaft is splined.

9. A vibration-reducing portal box assembly according to claim 1 wherein at least some of the central opening of said wheel hub is splined.

10. A vibration-reducing portal box assembly according to claim 1 wherein said assembly further includes an end of a stock axle received in said housing receptacle.

\* \* \* \* \*